United States Patent [19]

Pastor

[11] Patent Number: 5,073,935
[45] Date of Patent: Dec. 17, 1991

[54] METHOD FOR SECURE COMMUNICATION

[76] Inventor: Jose Pastor, 191 Wilton Rd., Westport, Conn. 06880

[21] Appl. No.: 628,247

[22] Filed: Dec. 17, 1990

[51] Int. Cl.$^5$ .......................... H04L 9/30; H04L 9/06; H04L 9/08
[52] U.S. Cl. .......................................... 380/30; 380/9; 380/21; 380/43; 380/49
[58] Field of Search ................................ 364/200, 900; 381/34–35; 380/21, 43, 4, 9, 23–25, 29, 30, 49

[56] References Cited

U.S. PATENT DOCUMENTS 4,386,416   5/1983   Giltner et al. ........................ 364/900

Primary Examiner—Bernarr E. Gregory
Attorney, Agent, or Firm—Robert H. Whisker; Melvin J. Scolnick; David E. Pitchenik

[57] ABSTRACT

A method for the secure communication of messages. A first party is provided with a set of numbers that have the property that when encrypted using an RSA encryption key the resulting set of encrypted numbers is of an order substantially smaller than that of the original set. If the encryption key and the original set of numbers are of the order of 200 decimal digits then the resulting set of encrypted numbers may be of the order of 15–30 decimal digits. To communicate a message the first party selects a number from the original set and applies a hashing function to the selected number to obtain a 64 binary bit DES key. The selected number is then encrypted with the RSA key and a message is encrypted with the DES key obtained. The encrypted message and the encrypted selected number are combined and the combined message is sent to a second party who has the corresponding RSA decryption key and knows the hashing function. The second party then decrypts the number, applies the hashing function to obtain the DES key and decrypts the message. Thus the parties may communicate with substantially the security of RSA while significantly reducing the minimum message length which may be securely encrypted.

12 Claims, 2 Drawing Sheets

METHOD FOR SECURE COMMUNICATION

BACKGROUND OF THE INVENTION

The subject invention relates to a method for the secure communication of messages. More particularly, it relates to a method whereby relatively short messages may be encrypted and communicated with a high degree of security. U.S. Pat. application Ser. No. 628,820, assigned to the assignee of the subject invention and filed on even date herewith, for: METHOD AND APPARATUS FOR THE RELIABLE AUTHENTICATION OF COMMUNICATION; to: J. Pastor, discloses an application of the invention of the subject application which is useful for authenticating messages such as postal indicia.

The following definitions and notations are used in the subject application:

E, D—are a pair of keys used in a "public key" encryption system.

K—is a key used in a "secret key" encryption system.

Keys may be specified by use of subscripts or functional notation as necessary. For example, $K_i(t)$ is the key used by the ith party for transaction t.

E[M]; D[M]; K[M]—represent encryption, using the specified key and the appropriate corresponding encryption technique, of a message M.

E[D[M]]; D[E[m]]; K[K[M]]—represent decryption, using the specified key and the appropriate corresponding encryption technique; of the encrypted message M.

(M1, E[P])—represents an unencrypted message comprising the specified elements. Note elements may have been previously encrypted.

{a'}—represents a set of numbers or values.

Hard/easy—as applied to a computation refer to the relation between the cost of the computation and the value of the result. A computation is "hard" if the cost of performing it, using the best available algorithm, is substantially greater than the value of the result. (Those skilled in the art will recognize that the above definition differs from that normally used in complexity theory. The above definition is preferred in the context of the subject which is directed to the protection of the information value of messages rather than theoretical considerations of complexity.)

The "order of a number or variable refers to the number of digits, or bits, needed to express the number or the greatest allowed value of the variable.)

The DES encryption technique is an encryption technique which was developed by the National Bureau 50 Standards, and is in wide spread use, particularly in the financial industry for the secure transfer of funds by wire. DES encrypts information in 64 bit blocks using a secret encryption key, also of the order of 64 bits, and decrypts the information using the same key. DES is well known in the art and a further description will not be necessary for an understanding of the subject invention.

Recently questions have been raised as to the security of the DES technique and another, more secure, technique for encryption, the RSA technique, has been developed. In this technique an encryption key pair E,D is provided and data encrypted using either key may only be decrypted by the other. Further, it is hard to determine one key from knowledge of the other. For this reason RSA is sometimes known as a "public key" system since knowledge of the key used for encryption may be widely distributed and only the key used for decryption need be kept secret. Like DES, RSA is a well known technique in the art and need not be described further for an understanding of the subject invention.

While highly successful as a method of providing secure transmission of messages RSA suffers from the disadvantage that keys and corresponding blocks of information must be of a relatively high order to provide adequate security. RSA encryption using a key of the order of 30 decimal digits can be broken using a modern super computer in only a few seconds of computing time; and it is believed that adequate security for RSA encryption is achieved only with keys on the order of 150-200 decimal digits. Since the encrypted messages are of the same order as the key used for encryption the resulting minimum order for RSA encrypted messages is substantially larger than the 64 bit block encrypted using DES. This of course is disadvantageous in applications where it is desirable to limit the amount of information transmitted. For example, in the above method co-pending application it is desirable to significantly reduce the amount of information which must be encrypted as part of a postal indicia because of the generally limited space available on a mail piece or label. Also, in many applications it is desirable to reduce the length of transmission in order to decrease the likelihood that the message will be intercepted.

Another secret key encryption technique which may be used in the subject invention and which is significantly more secure than DES and requires a relatively small key (though somewhat larger than a DES key) is the "eliptical logarithm technique". This technique, while not as commonly used as DES is well known in the cryptographic art and is further described in the above mentioned application filed on even date herewith. The eliptical logarithm technique is also described in Kolbitz, Neal; *A Course in Number Theory and Cryptography;* Chapter VI, Vol. 114, *Graduate Texts in Mathematics;* Springer-Verlag (1987).

Thus, it is an object of the subject invention to provide a method for the secure communication of messages which provides the security of RSA encryption while substantially reducing the order of the messages which are transmitted.

BRIEF SUMMARY OF THE INVENTION

The above objects are achieved and the disadvantages of the prior art are overcome in accordance with the subject invention by means of a method which includes generation of an encryption/decryption key pair $E_s, D_s$, where the keys are of a first order selected to provide a predetermined level of security, a set of numbers {a'} wherein numbers a' have the property that when encrypted with the key $E_s$ resulting encrypted numbers $E_s[a']$ are of an order substantially less than the first order, a hashing function H for mapping numbers a' onto numbers of third order smaller than the first order. Key $E_s$, set {a'}, and hashing function H are provided to a first party. Key $D_s$ and hashing function H are provided to a second party, who maintains at least $D_s$ in secret. To send a message the first party selects a particular one of the numbers a', encrypts the selected number a' with the key $E_s$ to obtain a particular value $E_2[a']$, and operates on the selected number a' with the hashing function H to obtain an encryption key $K_i$, equal to H(a'). The first party then forms a first level message M1 and encrypts the first level message M1 with the encryption key $K_i$. The first party then forms a second level message M2 which includes the encrypted first level message $K_i[M1]$ and the particular value $E_s[a']$ and sends the second level message M2 to the second party. The second party then recovers the particular value $E_s[a']$ from the received second level message M2 and decrypts the particular value $E_s[a']$ with key $D_s$ to obtain the selected number $a'$. The third party then operates on the selected number $a'$ with the hashing function H to obtain the encryption key $K_i$, recovers the encrypted first level message $K_i[M1]$ from the second level message M2, and decrypts the encrypted first level message $K_i[M1]$ with the encryption key $K_i$ to obtain the level message M1. (Messages can also be "signed" if encryption key $E_s$ is kept secret since only a party knowing $E_s$ can generate $E_s[a']$.)

In accordance with one aspect of the subjection invention the numbers $a'$ have a recognizable property (e.g., preselected bits in the binary representation of the numbers are identical for each number $a'$ in the set $\{a'\}$), in order to make the task of generating counterfeit communications more difficult for an unauthorized person in possession of key $D_s$.

In accordance with another aspect of the subject invention the first level message Ml is encrypted using the DES encryption technique.

In accordance with still another aspect of the subject invention the first party maintains the key $E_s$ in secret, and the second party is provided with a set of numbers $\{a''\}$, and the second party may communicate with the first party in a symmetrical manner.

Thus, it can be seen that the subject invention advantageously achieves the above objects and overcomes the disadvantages of the prior art. Particularly, since each key $K_i$ may be randomly chosen for each message M1 the technique of the subject invention provides the security (and the public key property) of RSA while requiring the transmission of substantially less data. Other objects and advantages of the subject invention will be apparent to those skilled in the art from consideration of the detailed description set forth below and of the attached drawing.

DETAILED DESCRIPTION OF PREFERRED EMBODIMENTS OF INVENTION

Figure 1:
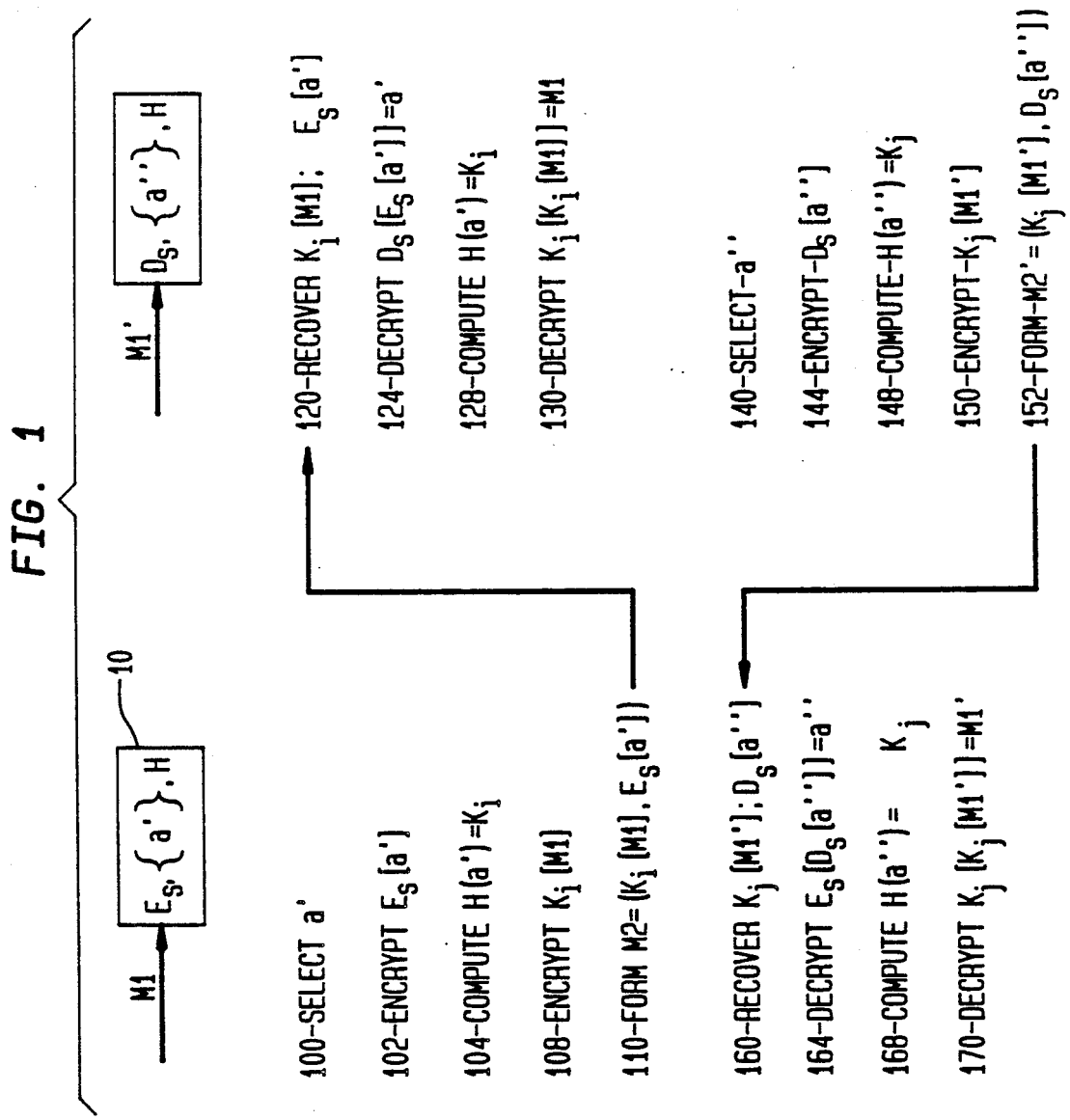
FIG. 1 shows a symbolic representation of a communication in accordance with the subject invention.

FIG. 1 shows a representation of communication in accordance with the subject invention. At 10 a first party is provided with an encryption key $E_s$ from an encryption/decryption key pair $E_s$, $D_s$, a set of numbers $\{a'\}$ and a hashing function H. The numbers $a'$ have the property that when encrypted with the key $E_s$ the values $E_s[a']$ are of an order substantially less than the order of the numbers $a'$. Preferably the numbers $a'$ may be of an order of from 150 to 200 digits and the values $E_s[a']$ may be of the order of 15 to 30 digits.

Those skilled in art will recognize that in general the set $\{a'\}$ will be too large for convenient storage as a list of numbers. Thus, the first party is preferably "provided" with a set $\{a'\}$ by providing the first party with the ability to compute numbers of the set. In the embodiment under discussion the first party may compute values of $a'$ from the relationship $a'=D_s[x]$; where x is number in the desired range for the values $E_s[a']$.

In accordance with a preferred embodiment of the subject invention the set of numbers $\{a'\}$ may be further restricted by selecting set $\{a'\}$ such that numbers $a'$ share a common, easily identifiable property. For example, if numbers $a'$ where of the order of 600 binary bits the set $\{a'\}$ could be chosen so that for all numbers $a'$ a particular 50 predetermined bits would be equal. That is, for example, for numbers $a'$ the first bit would be one, the seventh bit would be zero, etc. In this embodiment an off-line computation of a large number of values $D_s[x]$ would be made and the values computed would be examined to find some common property shared by a sufficiently large number of values. These values would then be selected as the set $\{a'\}$ and provided as a list to the first party. It will be hard for an unauthorized person in possession of key $D_s$ to find values of x such that $D_s[x]$ has the predetermined properties, i.e, is a member of the set $\{a'\}$. This will increase the difficulty faced by such person in producing counterfeit communications, as will see from the description set forth below.

Hashing function H maps number $a'$ onto a set of numbers of lower order such that H $(a')=K_j$ may be used as an encryption key.

The second party is provided with key $D_s$ and hashing function H, and maintains at least key $D_s$ in secret.

To communicate a message, at 100 the first party selects a number $a'$ and at 102 encrypts the selected number $a'$ with key $E_s$ to obtain a particular value $E_s[a']$. Then at 104 the first party operates on the selected number $a'$ with hashing function H to obtain an encryption key $K_i$ which is preferably a DES key. At 108 the first party encrypts message M1 with encryption $K_i$, and at 110 forms a message M2 which includes encrypted message $K_i[M1]$ and particular value $E_s[a']$ and sends the message to the second party. At 120 the second party recovers encrypted message $K_i[M1]$ and particular value $E_s[a']$ from message M2, and at 124 decrypts particular value $E_s[a']$ with key $D_s$ to obtain $D_s[E_s]a']]$ equal to selected number $a'$. At 128 the second party then operates on selected number $a'$ with hashing function H to obtain encryption key $K_i$ then, at 130 the second party decrypts encrypted message $K_i[M1]$ with encryption key $K_i$ to obtain M1 equal to $K_i[K_i[M1]]$.

If the second party desires to sent a return communication the second party is provided with a second set of numbers $\{a''\}$ which when encrypted with key $D_s$ provide particular values $D_s[a'']$ in the same manner as has been described above for set $\{a'\}$ and key $E_s$.

Then at 140 the second party selects a number $a''$ and at 144 encrypts selected number $a''$ with key $D_s$ to obtain particular value $D_s[a'']$. At 148 the second party operates on selected number $a''$ with hashing function H to obtain encryption key $K_j$, and at 150 encrypts response message M1' with encryption key $K_j$. At 152 the second party forms a second level response message M2' which includes encrypted message $K_j[M1']$ and particular value $D_s[a'']$, and sends second level response message M2' to the first party.

At 160 the first party receives message M2' and recovers encrypted message $K_j[M1']$ and particular value $D_s[a'']$. At 164 the first party decrypts particular value $D_s[a'']$ with key $E_s$ to obtain selected number $a''$ equal to $E_s[D_s]a'']]$. At 168 the first party operates on selected number $a''$ with hashing function H to obtain encryption key $K_j$ equal to $H(a'')$. At 170 the first party decrypts encrypted message $K_j[M1']$ with encryption key $K_j$ to obtain response message $M1'$ equal to $K_j[K_j[M1']]$.

If the response messages M1 prime are to be secure then the first party must keep key $E_s$ in secret. However, even if key $E_s$ is known response message $M1'$ still have the property that they are in effect "signed" by the second party since only message encrypted with key $D_s$ have any significant possibility of producing a meaningful message when decrypted with key $E_s$.

Figure 2:
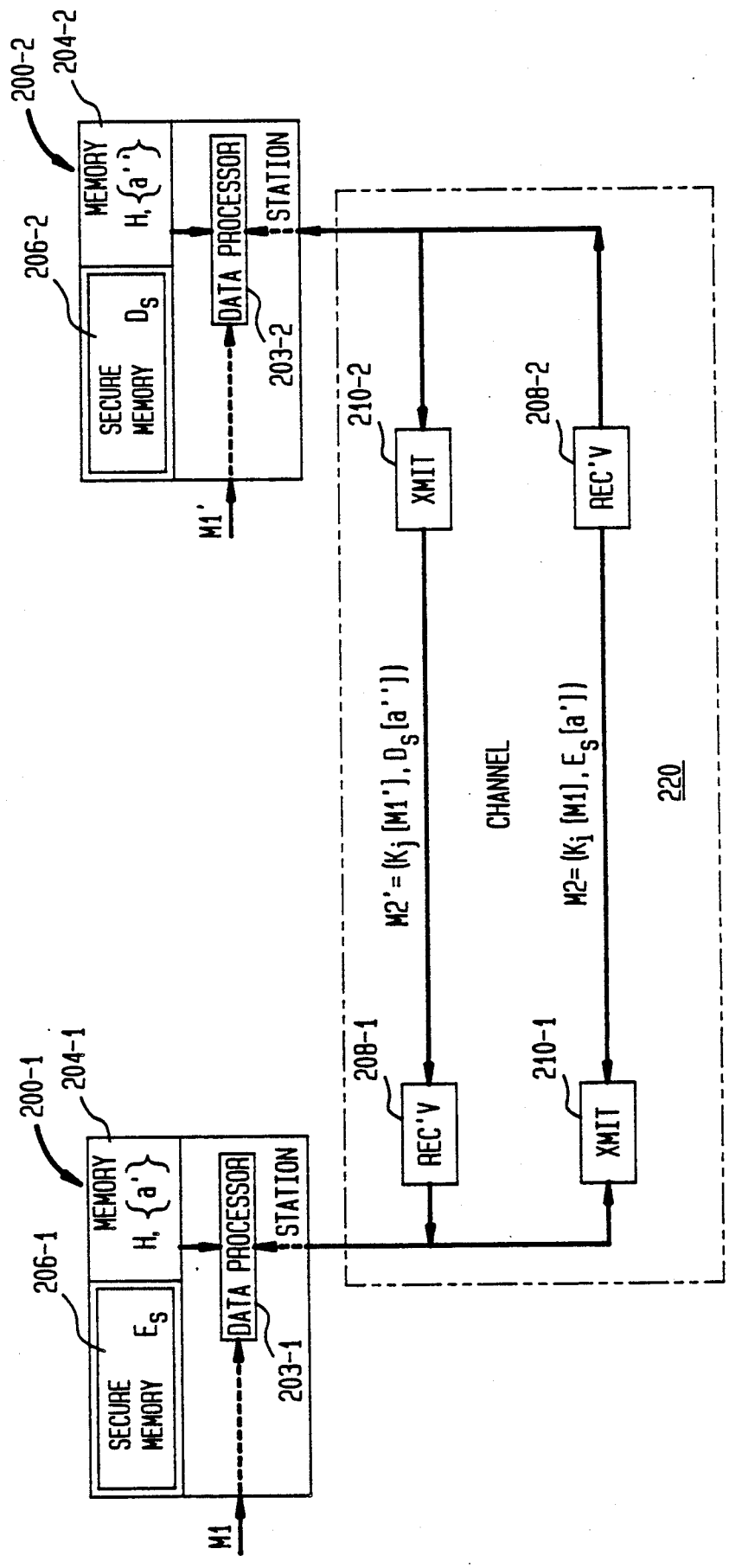
FIG. 2 shows a schematic block diagram of a system for communication in accordance with the subject invention.

FIG. 2 shows a system for communication using the technique of the subject invention. Station 200-1 includes a data processor 203-1, and memories 204-1 and 206-1. Memory 204-1 stores hashing function H and set $\{a'\}$, as described above, while, since the system of FIG. 2 is intended for secure two-way communication, memory 206 is a secure memory which stores key $E_s$, as described above. Of course, if response messages need not be secure memory 206-1 need not be secure and may be a portion of memory 204-1.

Data processor 203-1 is also connected to receiver 208-1 and transmitter 210-1 for communication over channel 220.

Station 200-2 is substantially constructionally identical to station 200-1, differing in that memory 204-2 stores set $\{a''\}$ with hashing function H, and secure memory 206-2 stores key $D_s$.

Channel 220 is intended to be completely general and details of its structure form no part of this invention. Thus, for example, receiver 208-1 and transmitter 210-1, and receiver 208-2 and transmitter 210-2 may each be comprised in a modem and channel 220 may be a communications path through the public switch telephone network. Or, receivers 208-1 and transmitter 210-1, and receiver 208-2 and transmitter 210-2 may be radio equipment and channel 220 may be a radio frequency channel.

In operation data processor 203-1 receives message M1 from a conventional data source (not shown) which forms no part of the subject invention. Data processor 203-1 then selects a number $a'$, generates an encryption key $K_i$ and forms message M2 for transmission as described above. Data processor 203-2 then recovers encrypted message $K_i[M1]$ and particular value $E_s[a']$ from message M2, recovers key $K_i$ and decrypts encrypted message $K_i[M1]$ to recover message M1 as described above. As also described above, transmission of response message $M1'$, received from another conventional data source (not shown), which also forms no part of the subject invention, is carried out in an essentially manner; encrypting a particular number $a''$ with key $D_s$ to form second level response message $M2'$ for transmission over channel 220, and corresponding decryption by station 200-1.

The embodiments described above and shown in the attached drawings have been provided way of illustration only, and numerous other embodiments will be apparent to those skilled in art from consideration of the present disclosure. Accordingly, limitations on the subject invention are to be found only in the claims set forth below.

I claim:

1. A method for secure communications comprising the steps of:
  a) providing a first party with:
    a1) a key $E_s$, said key $E_s$ being one key of an encryption/decryption key pair $E_s,D_s$, said key pair $E_s,D_s$, comprising keys $E_s$ and $D_s$ of a first order selected to provide a predetermined level of security;
    a2) a set of numbers $\{a'\}$, said numbers $a'$ having the property that when encrypted with said key $E_s$ values $E_s[a']$ of a second order substantially less than said first order are obtained; and
    a3) a hashing function H for mapping said numbers $a'$ onto numbers of a third, smaller order;
  b) providing a second party with said key $D_s$ and said hashing function H, said second party keeping said key $D_s$ in secret;
  c) said first party communicating a message M1 by the steps of:
    c1) selecting a number $a'$ from said set $\{a'\}$;
    c2) encrypting said selected number $a'$ with said key $E_s$ to obtain a particular value $E_s[a']$;
    c3) operating on said selected number $a'$ with said hashing function H to obtain a single key encryption key $K_i$, $K_i$ being equal to $H(a')$;
    c4) encrypting a message M1 with said key $K_i$;
    c5) forming a second level message M2 including said encrypted message $K_i[M1]$ and said particular value $E_s[a']$, and sending said second level message to said second party; and
  d) said second party receiving said second level message and:
    d1) recovering said particular value $E_s[a']$ from said second level message M2;
    d2) decrypting said particular value $E_s[a']$ to obtain said selected number $a'$
    d3) operating on said selected number $a'$ with said hashing function H to obtain said key $K_i$ equal to $H(a')$;
    d4) recovering said encrypted message $K_i[M1]$ from said second level message M2; and
    d5) decrypting said encrypted message $K_i[M1]$ with said key $K_i$ to obtain said message M1 equal to $K_i[K_i[M1]]$.

2. A method as described in claim 1 wherein said encryption in step (4) is DES encryption.

3. A method as described in claim 2 wherein said numbers $a'$ share a recognizable property.

4. A method as described in claim 3 wherein said first party keeps said key $E_s$ in secret.

5. A method as described in claim 2 wherein said first party keeps said key $E_s$ in secret.

6. A method as described in claim 1 wherein said numbers $a'$ share a recognizable property.

7. A method as described in claim 6 wherein said first party keeps said key $E_s$ in secret.

8. A method as described in claim 1 wherein said first party keeps said key $E_s$ in secret.

9. A method as described in claim 1 wherein said second party is provided with a second set of numbers $\{a''\}$, said numbers having the property that when encrypted with said key $D_s$ values $D_s[a'']$ of a fourth order substantially less than said first order are obtained comprising the further steps of:
  a) said second party communicating a message $M1'$ by the steps of:
    a1) selecting a number $a''$ from said set $\{a''\}$;
    a2) encrypting said selected number $a''$ with said key $D_s$ to obtain a particular value $D_s[a'']$
    a3) operating on said selected number $a''$ with said hashing function H to obtain a single key encryption key $K_j$, $K_j$ being equal to $H\{a''\}$;
    a4) encrypting as message $M1'$ with said key $K_j$;

a5) forming a second level message M2' including said encrypted message $K_j[M1]$ and said particular value $D_s[a'']$, and sending said second level message M2 to said first party; and b) said first party receiving said second level message and:

b1) recovering said particular value $D_s[a'']$ from said second level message M2';

b2) decrypting said particular value $D_s[a'']$ to obtain said selected number $a''$;

b3) operating on said selected number $a''$ with said hashing function H to obtain said key $K_j$ equal to $H(a'')$;

b4) recovering said encrypted message $K_j[M1']$ from said second level message M2'; and b5) decrypting said encrypted message $K_j[ml'']$ with said key $K_j$ to obtain said message M1' equal to $K_j[k_j[M1']]$.

10. A system for transmitting secure communications, comprising:

a) first means for storing a key $E_s$, said key $E_s$ being on of an encryption/decryption key pair $E_s, D_s$, said key pair comprising keys $E_s$ and $D_s$ of a first order selected to provide a predetermined level of security;

b) second means for storing:

b1) a set of numbers $(a')$, said numbers $a'$ having the property that when encrypted with said key $E_s$ values $E_s[a']$ of s second order substantially less than said first order are obtained; and b2) a hashing function H for mapping said numbers $a'$ onto numbers of a third smaller order;

c) data processing means responsive to said first and second storing means for:

c1) selecting a number $a'$ from said set $(a')$;

c2) encrypting said selected number $a'$ with said key $E_s$ to obtain a particular value $E_s[a']$;

c3) operating on said selected number $a'$ with said hashing function H to obtain a single key encryption key $K_j$, $K_j$ being equal to $H(a')$;

c4) encrypting a message M1 with said key $K_j$;

c5) forming a second level message M2 including said encrypted first level message $K_j[M1]$ and said particular value $E_s[a']$; and, d) transmission means responsive to said data processing means for sending said second level message M2.

11. A system as described in claim 10 wherein said first storing means is secure against access by unauthorized parties to said key $E_s$.

12. A system for receiving secure communications, comprising:

a) secure first means for storing a key $D_s$, said key $D_s$ being one of an encryption/decryption key pair $E_s$, $D_s$, said key pair comprising keys $E_s$ and $D_s$ of a first order selected to provide a predetermined level of security;

b) second means for storing: a hashing function H for mapping numbers $[a']$ of a set $\{a'\}$, said numbers $a'$ having the property that when encrypted with said key $E_s$ values $E_s[a']$ of a second order substantially less than said first order are obtained, onto numbers of a third, smaller order c) receiving means for receiving messages; and, d) data processing means responsive to said first and second storing means and said receiving means for:

d1) receiving a second level message M2, and recovering an encrypted message $K_j[M1]$ and a particular value $E_s[a']$ from said second level message M2;

d2) decrypting said particular value $E_s[a']$ to obtain a selected number $a'$:

d3) operating on said selected number $a'$ with said hashing function H to obtain a key $K_j$;

d4) decrypting said encrypted message $K_j[M1]$ with said key $K_j$ to obtain said message M1 equal to $K_j[K_j[M1]]$.

* * * * *